(12) United States Patent
Puhawan

(10) Patent No.: US 6,726,057 B2
(45) Date of Patent: Apr. 27, 2004

(54) ORIENTING EJECTOR

(75) Inventor: Renato Puhawan, Baldwin Park, CA (US)

(73) Assignee: Fairchild Holding Corporation, Dulles, VA (US)

( * ) Notice: Subject to any disclaimer, the term of this patent is extended or adjusted under 35 U.S.C. 154(b) by 154 days.

(21) Appl. No.: 09/997,555

(22) Filed: Nov. 29, 2001

(65) Prior Publication Data

US 2002/0179631 A1 Dec. 5, 2002

Related U.S. Application Data

(60) Provisional application No. 60/296,010, filed on Jun. 5, 2001.

(51) Int. Cl.⁷ ................................................. B23Q 7/12
(52) U.S. Cl. ......................... 221/165; 221/171; 221/278
(58) Field of Search ................................ 221/157, 163, 221/165, 171, 172, 173, 278; 227/107, 112, 119

(56) References Cited

U.S. PATENT DOCUMENTS

| | | | |
|---|---|---|---|
| 4,363,573 A | * | 12/1982 | Ginther et al. |
| 4,960,360 A | | 10/1990 | Giannuzzi et al. |
| 5,014,876 A | * | 5/1991 | Young et al. |
| 5,065,898 A | * | 11/1991 | Michalewski et al. |
| 5,201,892 A | | 4/1993 | Salter |
| 6,129,200 A | * | 10/2000 | Graham |

FOREIGN PATENT DOCUMENTS

| | | |
|---|---|---|
| EP | 0 481 586 A1 | 4/1992 |
| EP | 0 647 500 A1 | 4/1995 |

* cited by examiner

*Primary Examiner*—David H. Bollinger
(74) *Attorney, Agent, or Firm*—Christie, Parker & Hale, LLP

(57) ABSTRACT

An orienting ejector is provided capable of orienting and ejecting fasteners of any size such as fasteners having a length that is greater than, equal to, or less than the diameter of their head. The orienting ejector is able to orient a fastener to an appropriate orientation prior to ejecting. A sensor is used to sense whether the fastener is oriented properly. If the fastener is not oriented properly, the orienting ejector discards the fastener.

25 Claims, 7 Drawing Sheets

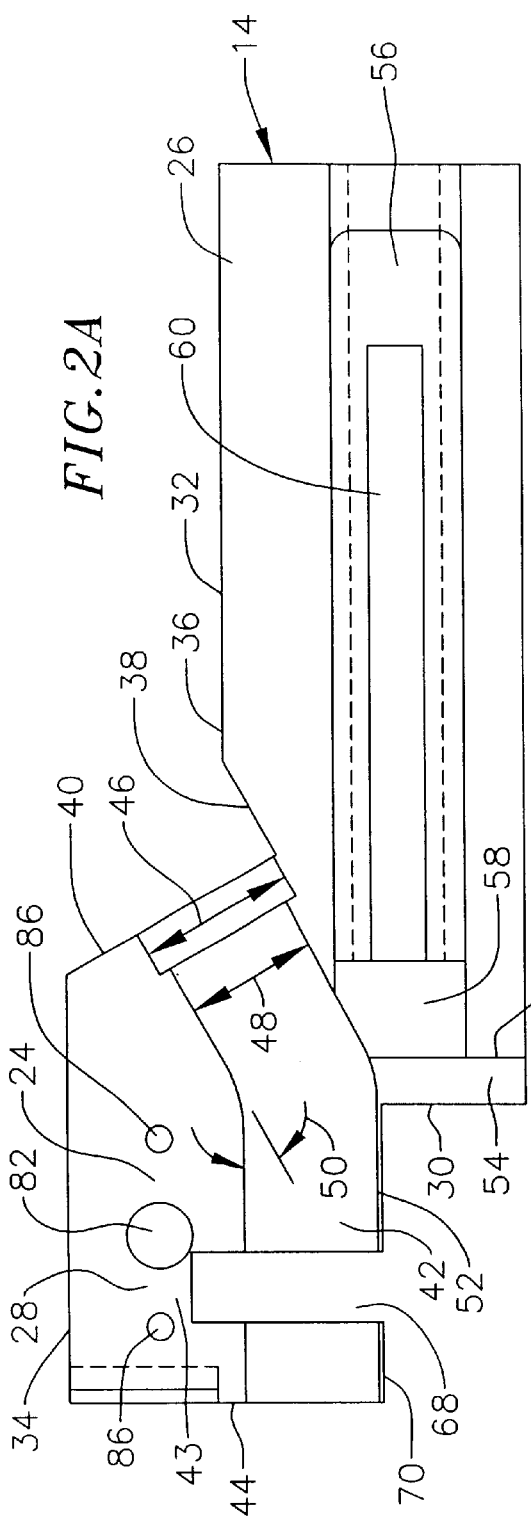
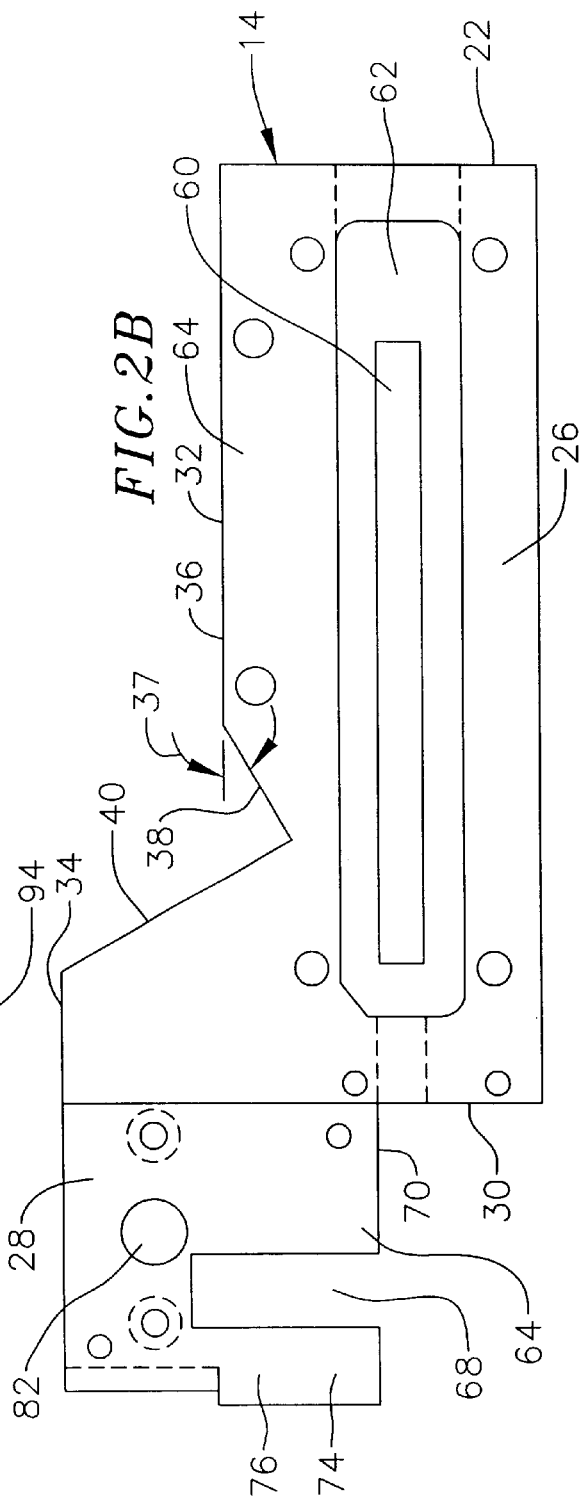

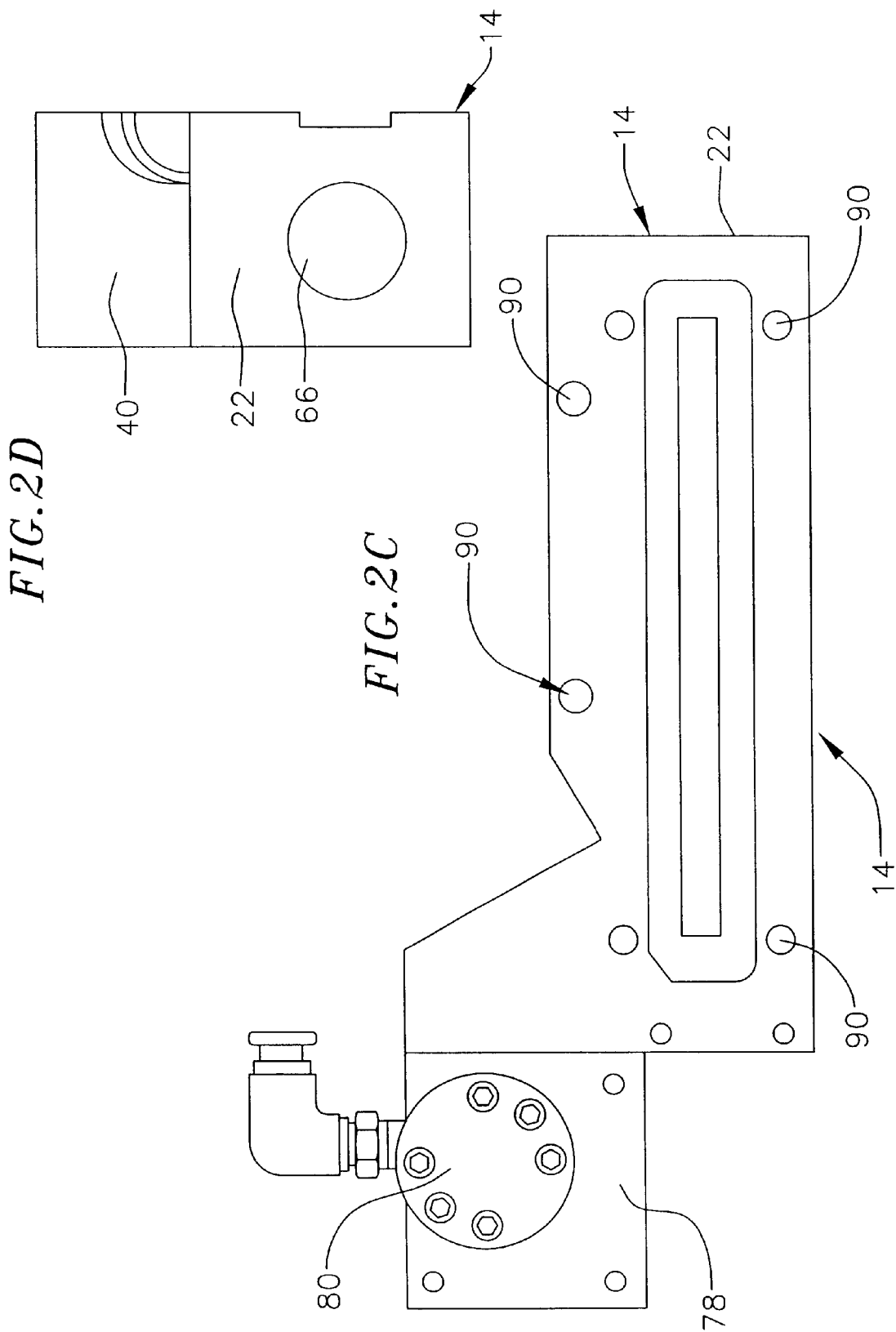

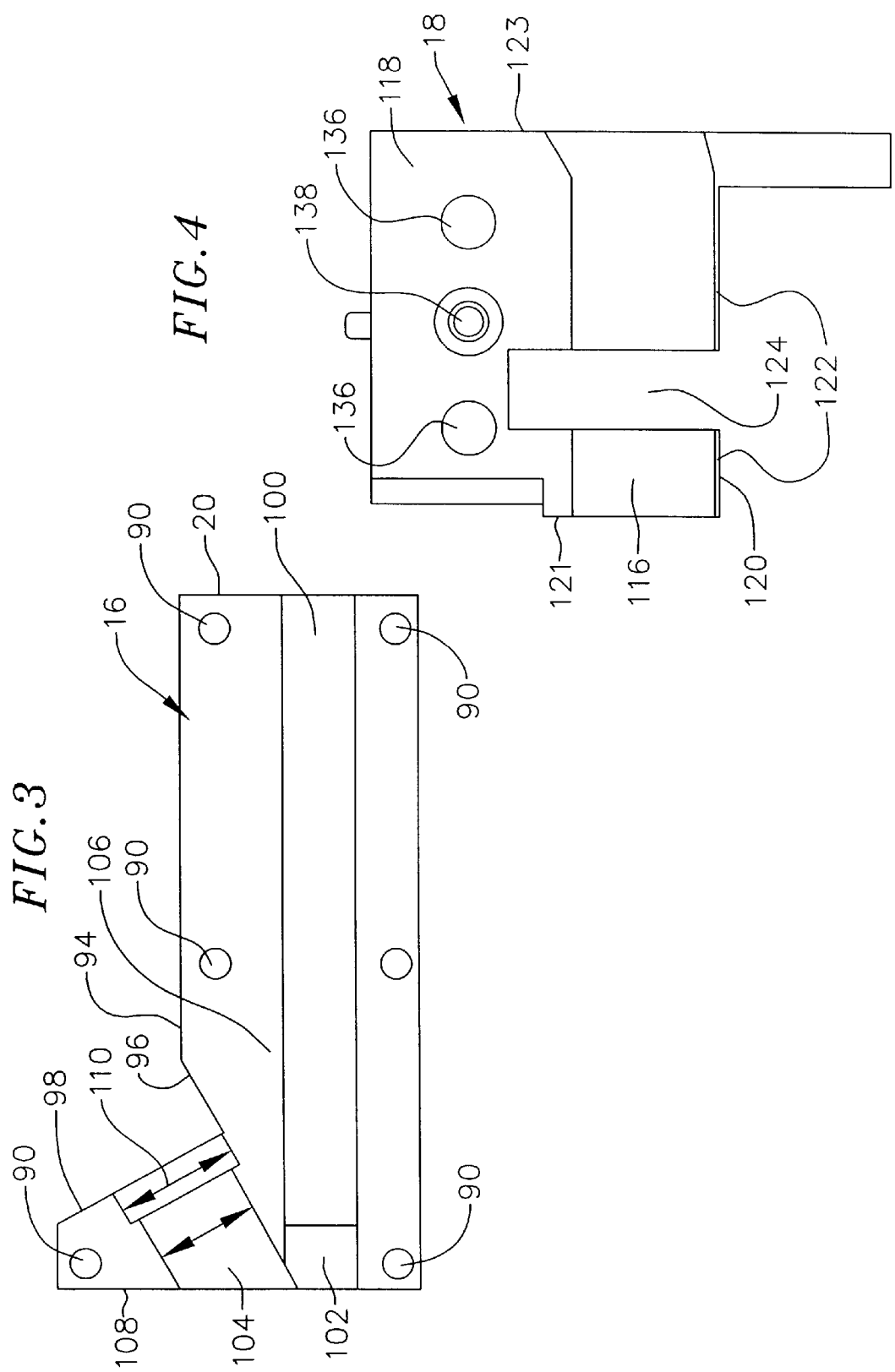

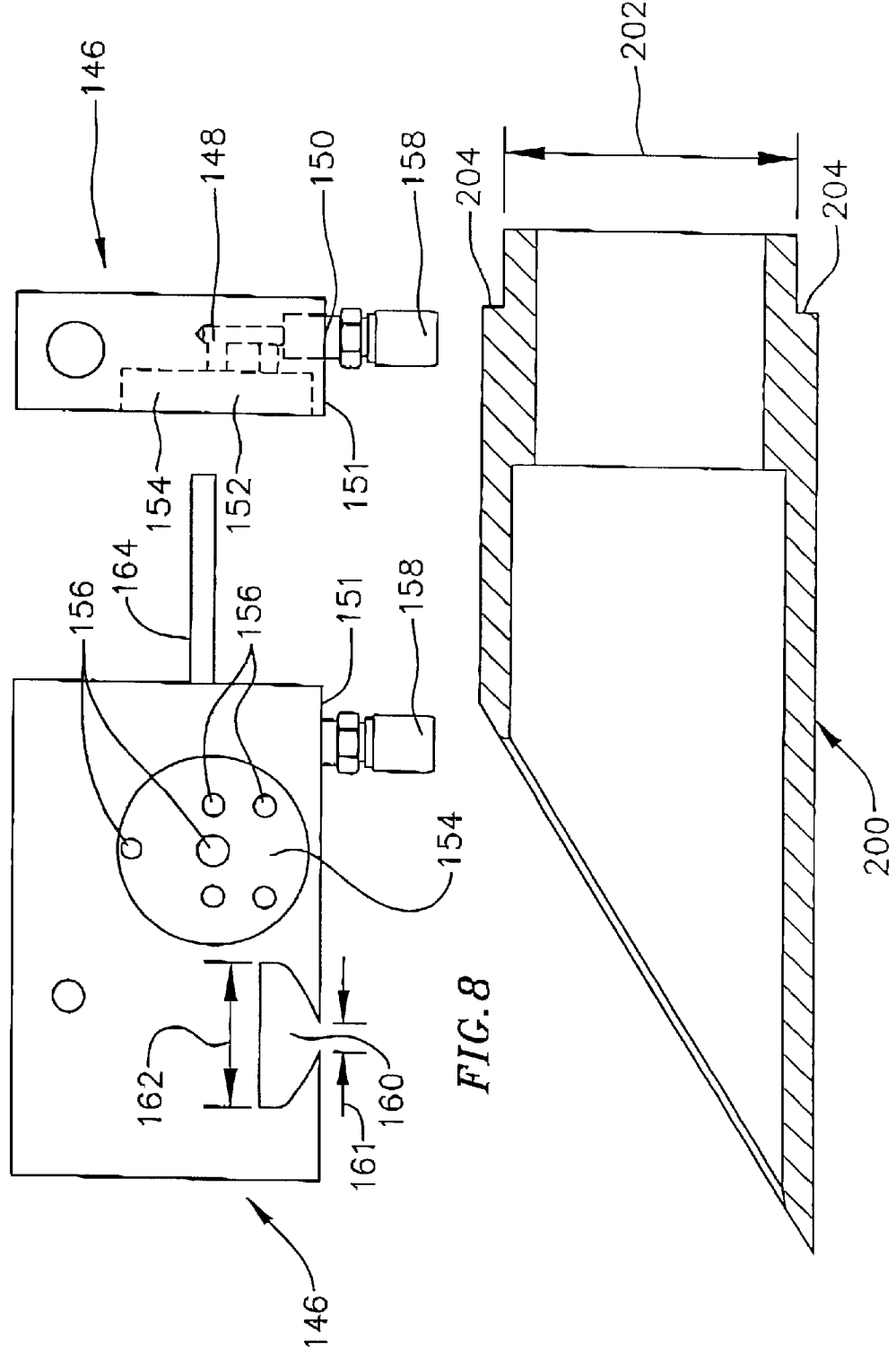

ORIENTING EJECTOR

CROSS REFERENCE TO RELATED APPLICATION

This application is based upon and claims priority of U.S. Provisional Application No. 60/296,010, filed on Jun. 5, 2001, the contents of which are fully incorporated herein by reference.

BACKGROUND OF THE INVENTION

This invention relates to orienting injectors and more specifically to orienting injectors that are capable of orienting fasteners having a length that is greater than, equal to, or less than the diameter of their head.

Current fastener ejectors are used to eject fasteners at a work site so that the fasteners can be installed onto a structure with an automated process. The problem with current ejectors is that they cannot orient all fasteners and especially fasteners whose length is equal to their head diameter. This is because, these ejectors cannot ascertain the orientation of the fasteners prior to ejecting them. As such, an orienting ejector is desired that is capable of properly orienting and ejecting fasteners of any size whether their length is greater than, equal to, or less than their head diameter.

SUMMARY OF THE INVENTION

An orienting ejector is provided that is capable of orienting fasteners such as rivets, screws, bolts, etc. of any size, as for example, rivets having a shaft and a head whose overall length is greater than, equal to, or less than their head diameter. The orienting ejector comprises a body defining a gap. The gap has a width that is greater than the diameter of the fastener's shaft but smaller than the diameter of the fastener head. The fastener is fed through the gap. A blade slidable along the gap is used to move the fastener such that the fastener shaft penetrates the gap. The blade may jab at the fastener in order to orient it. Air is also ejected at the fastener to help properly orient the fastener. A sensor senses whether the fastener has been oriented properly prior to ejection. If it has, the sensor sends a signal to a controller, which in turn sends a signal to the ejector to eject the fastener in the proper oriented position. If the fastener cannot be oriented properly within a predetermined time, the gap is widened allowing the fastener to drop out of the body and into a pan. Vacuum may be applied to the pan for removing the discarded fastener.

BRIEF DESCRIPTION OF THE DRAWINGS

FIGS. 2A and 2B are alternate side views of an exemplary embodiment first main block used to form the body of the exemplary embodiment orienting ejector shown in FIG. 1A.

FIG. 2C is a side view of the exemplary embodiment first main block shown in FIG. 2B with an actuator attached thereto.

FIG. 2D is a rear end view of the exemplary embodiment first main block shown in FIGS. 2A and 2B.

FIG. 3 is a side view of an exemplary embodiment second main block used to form the exemplary embodiment orienting ejector shown in FIG. 1A.

FIG. 4 is a side view of an exemplary embodiment third main block used to form the exemplary embodiment orienting ejector shown in FIG. 1A.

FIGS. 5A and 5B are front and end views, respectively of an exemplary embodiment metering block used in the exemplary embodiment orienting ejector shown in FIG. 1A.

FIG. 8 is a cross-sectional view of an exemplary embodiment tube adapter incorporated in the exemplary embodiment orienting ejector shown in FIG. 1A.

DETAILED DESCRIPTION OF THE INVENTION

An orienting ejector is provided that is capable of orienting fasteners such as rivets of any size, as for example, rivets whose length is equal to their head diameter. For convenience, an exemplary embodiment ejector will be described herein for orienting and ejecting rivets. However, the oriented ejectors of the present invention can be used to orient and eject other types of fasteners, as for example screws, bolts, nails, etc.

An exemplary embodiment orienting ejector of the present invention receives rivets which it orients and ejects in a proper position for insertion in a desired structure. The exemplary ejector of the present invention is able to orient rivets of any size even rivets whose head diameter is equal to their length.

For descriptive purposes, the terms "front," "forward," "rear," "rearward," "back," "top," "higher," "lower," and "bottom" are used to describe relative locations and are not meant to denote actual locations. For descriptive purposes, the terms "forward" and "front" are used herein to denote an area closest to or at the location of the ejector from where the rivets are ejected. The term "rear," "rearward," or "back" are used to denote ends or portions of the ejector opposite the front end or furthest from the front end.

Figure 1A:
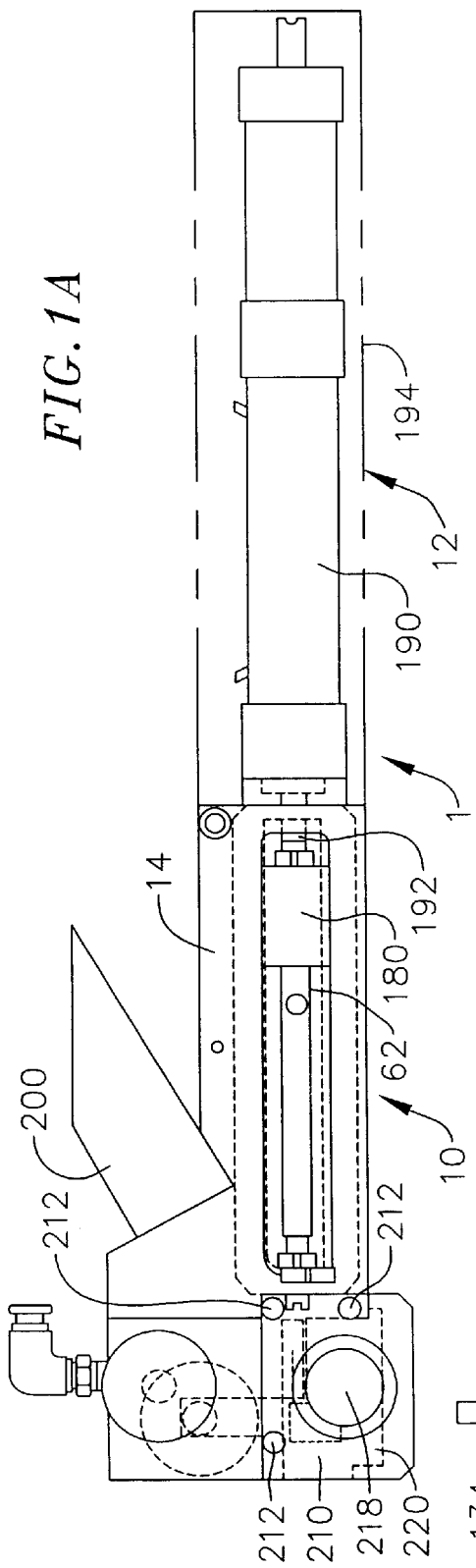
FIG. 1A is a side view of an exemplary embodiment orienting ejector.
Figure 1B:
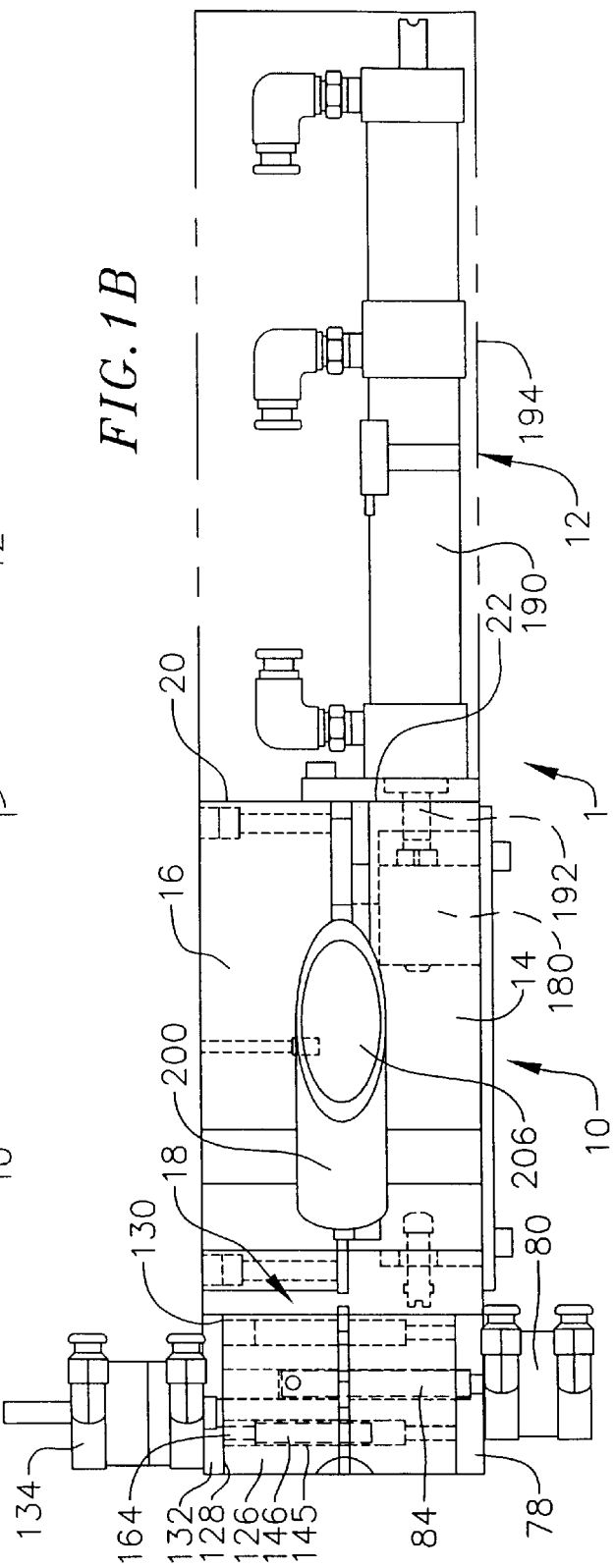
FIG. 1B is a top view of the orienting ejector shown in FIG. 1A.

An exemplary embodiment orienting ejector 1 of the present invention comprises a body 10 and a tail section 12 coupled to the body 10 as for example shown in FIGS. 1A and 1B. The body is formed from three main blocks. A first main block 14 defines a longitudinal half of the body (FIGS. 2A and 2B) A second main block 16 (FIG. 3) and a third main block 18 (FIG. 4)define the remaining half of the body. In the exemplary embodiment, the blocks are formed by machining hard anodized aluminum.

The second block 16 is fastened to the first block 14. The rear end 20 of the second block is aligned with the rear end 22 of the first block. The third block 18 is coupled to a front end portion 24 of the first block and is aligned in front of the second block 16 as for example shown in FIG. 1B.

The first main block comprises a lower section 26 from which extends an upper section 28 (FIGS. 2A and 2B). The upper section also extends beyond a forward end 30 of the lower section 26. Upper surfaces 32, 34 of the two sections define a body upper surface 36 that is stepped. A portion of the lower section upper surface 32 declines at a relatively shallow angle as for example at an angle 37 of about 30° forming a first inclining surface 38. A second inclining surface 40 extends from the first inclining 38 surface to the upper surface 34 of the upper section 28. In the exemplary embodiment, the second inclining 40 surface intersects the first inclining surface 38 at about a 90° angle.

A first semi-cylindrical groove 42 is formed on a first side surface 43 of the first main block extending normally from the second inclining surface 40 and to a front end 44 of the first main block. The diameter 46 of the first semi-cylindrical groove is greatest at the second inclining surface 40 and it is stepped down to a smaller diameter 48 at small distance away from the second inclining surface. In the exemplary embodiment, the first semi-cylindrical groove bends at an angle 50 of about 30° such that the semi-cylindrical groove is normal to the front end surface 44 of the first main block. A lower surface of the upper section 24 defines a lower edge 52 of the first semi-cylindrical groove 42.

In the exemplary embodiment shown in FIG. 2A, a portion of the first side surface 43 of the first main block at the front end 30 of the lower section 26 is recessed forming a recessed strip 54. The recessed strip extends from the lower surface of the first section to the lower edge of the first semi-cylindrical groove. In the exemplary embodiment shown, the recessed strip has a width of about ⅜ of an inch is recessed.

A longitudinal recess 56 is formed along the lower section 26 of the first main body block. The longitudinal recess extends from the rear end 22 of the first block and lower section to the recessed strip 54. With the exception of a front end portion 58, the depth of the longitudinal recess is preferably the same as the depth of the recessed strip. The depth of the front end portion 58 of the longitudinal recess extending to the recessed strip is less than the depth of the recessed strip, thus forming a raised portion relative to the longitudinal recess. An upper portion of the front end portion 58 of the longitudinal recess intersects the lower edge 52 of the semi-cylindrical groove.

A slot 60 having a width smaller than the width of longitudinal recess is formed longitudinally along and within the longitudinal recess 56 extending to the raised front end portion 58 of the recess. The slot 60 extends into a larger cavity 62 formed in the first main body lower section 26 which opens to a second side surface 64 of the first main block opposite the first side surface as for example shown in FIG. 2B. An opening 66 is formed on the rear end 22 of the first main block communicating with the cavity 62 (FIG. 2D).

A transverse slot 68 is formed transversely through the upper section 28 of the first main block. The slot opens to the first side surface 43 of the first main block and also opens to a lower surface 70 of the lower section of the first main block. The transverse slot intersects a forward portion of the semi-cylindrical depression 42.

In the exemplary embodiment shown in FIG. 1, the thickness of a front end portion 74 of the upper section is reduced on the second side surface 64 of the first main block. In this regard, a recess 76 is formed. The transverse slot 68 extends from the first side surface 43 to the recess 76 formed on the second side surface 64. A plate 78 onto which is coupled a first actuator 80 as for example an air cylinder is mated to the recess 76 formed on the upper section of the first main block.

In an alternate embodiment, the thickness of the front end portion 74 of the upper section is not reduced. With this embodiment, the transverse slot extends from the first side surface but does not extend to the second side surface. The first actuator may be coupled to the second side surface of the front end portion 74 of the upper section.

In the exemplary embodiment shown in FIGS. 2A and 2B, an opening 82 is formed extending from the first side surface 43 and through the upper section 24 of the first main body block and to the forward portion recess 76 of the second side surface 64. An actuating pin or member 84 of the first actuator 80 extends through the plate 78 and is fitted through the opening 82 and extends beyond the first surface 43 of the first main block. Two pins 86 also extend from the first side surface 43 of the upper section.

The second main block 16 mates to the first main block 14 such that the rear end 20 of the second main block is aligned with rear end 22 of the first main block. When mated to the first main block, a front end 92 (FIG. 3) of the second main block is aligned with a rear end 94 (FIG. 2A) of the recessed strip formed on the first main block. The second main block also has a stepped upper surface 94 corresponding the stepped upper surface 36 of the first main block including a first and a second inclined surfaces 96, 98 corresponding to the first and second inclined surfaces 38, 40 formed on the first main block.

The second main block also includes a longitudinal recess 100 corresponding to the longitudinal recess 56 on the first main block. The longitudinal recess formed on the second main block also has a front end portion 102 which is raised relative to the remaining portion of the recess. The front end portion 102 of the second body block longitudinal recess corresponds to the raised front end portion 58 formed on the first main body block longitudinal recess.

A second semi-cylindrical groove 104 is formed on a first side surface 106 of the second main block extending normally from the second inclining surface 98 and to a front end 108 of the second main block. The diameter 110 of the second semi-cylindrical groove is greatest at the second inclining surface and it is stepped down to a smaller diameter 112 at small distance away from the second inclining surface 98 of the second main block.

Figure 1C:
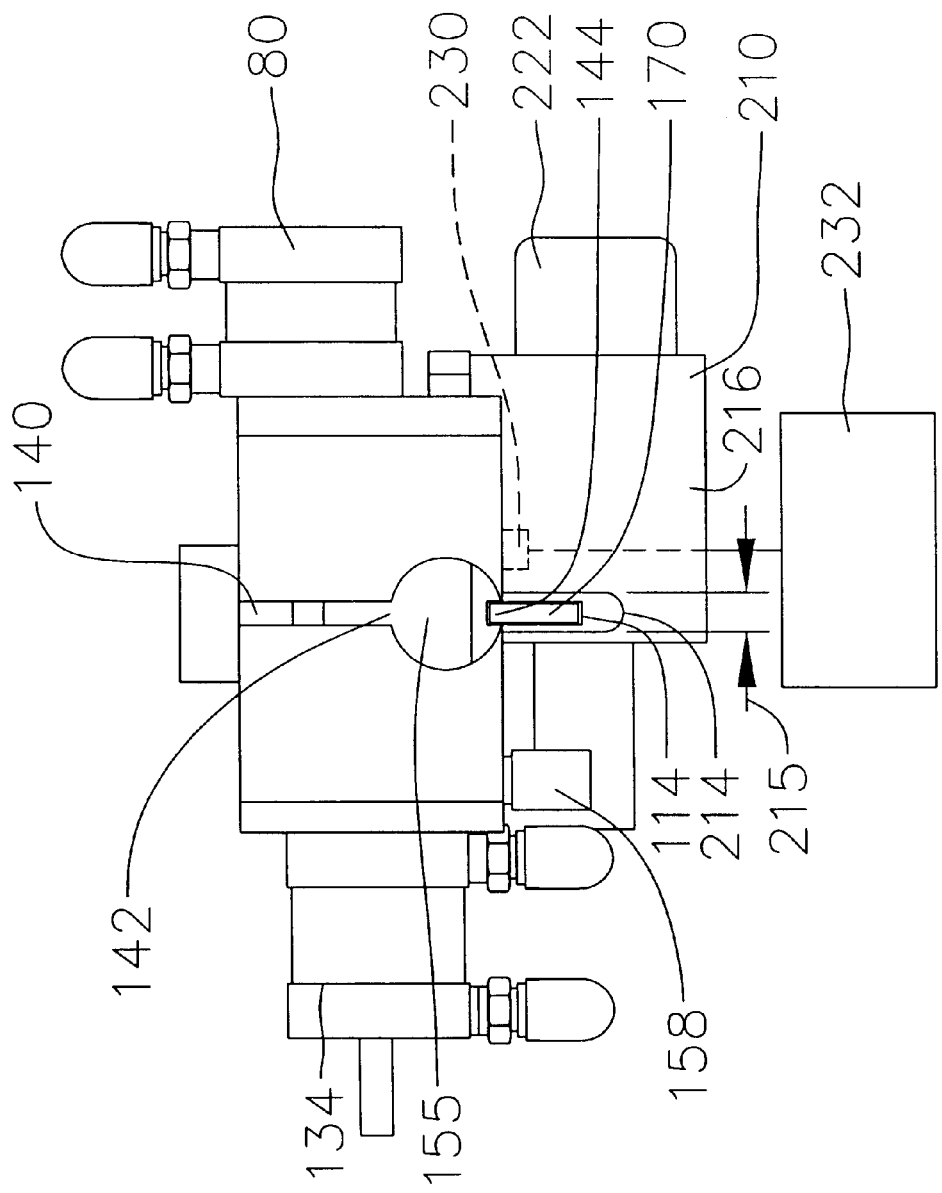
FIG. 1C is a front view of the orienting ejector shown in FIG. 1A.

The second main block may be mated to the first main block by fastening with screws fitted and/or threaded through openings 90 formed on the first and second main blocks. When the second main block is fastened to the first main block, the longitudinal recesses 56, 100 of the two blocks are aligned defining an internal slot 114 (FIG. 1C). Moreover, when mated, the first semi-cylindrical groove 42 of the first block is mated with the second semi-cylindrical groove 104 of the second block defining a cylindrical section having a larger diameter portion which is stepped to a smaller diameter portion.

The third main body block 18 comprises a third semi-cylindrical groove 116 formed on a first side surface 118 of the third block and corresponding to a front portion of the first semi-cylindrical groove 42 formed on the first main block as for example shown in FIG. 4. The third semi-cylindrical groove extends from a front end 121 to a rear end 123 of the third main block. A lower surface 120 of the third block defines a lower edge 122 of the third semi-cylindrical groove.

A transverse slot 124 is formed transversely through the third main block. The transverse slot opens to the first side surface 118 and to the lower surface 120 of the third main block. The transverse slot intersects the third semi-cylindrical groove 116. In the exemplary embodiment shown in FIG. 1B, the thickness of a front end portion 126 of the third main block is reduced on a second side surface 128 of the third block opposite the first side surface 118 of the third block. In this regard, a recess 130 is formed. The transverse slot 124 extends from the first side surface to the recess on the second side surface of the third main block.

A plate 132 onto which is coupled a second actuator 134, as for example an air cylinder, is mated to the recess 130 formed on the third block. In an alternate embodiment, the thickness of the front end portion of the third main block is not reduced. With this embodiment, the transverse slot extends from the first side surface but does not extend to the second side surface of the third main block. The second actuator may be coupled to the second side surface of the third main block.

Two openings 136 are formed above the third semi-cylindrical groove 116 through the first side surface 118 to accommodate the two pins 86 extending from the first block. In an alternate embodiment, the pins may be extending from the third block and the openings to accommodate them may be formed on the first block. A third opening 138 is formed through the first side surface of the third main block. In the exemplary embodiment, the third opening does not penetrate the entire thickness of the third main block.

The actuator pin 84 extending from the first actuator is fitted though the third opening and is fixed relative to the opening. This can be accomplished by threading the actuator pin to the third opening or by otherwise attaching the actuator pin to the third opening. When this occurs, the two pins 86 extending from the first body penetrate the two openings 136 formed on the third body. In this regard the first actuator can cause the actuator pin and thus, the third block fixed to the actuator pin to move relative to the first body along the two pins 86.

When the third block 18 is mated to the first block 14, the two blocks are spaced apart forming a gap 140 as for example shown in FIG. 1C. The first and third semi-cylindrical grooves define a cylinder having two opposing longitudinal slots or gaps 142, 144 defined between the upper edges of the first and third semi-cylindrical grooves and between the lower edges of said grooves. The gap between the first and third blocks is wide enough to allow for penetration by the shaft of a fastener or rivet and narrow enough to prevent penetration by the head of a fastener or rivet.

Furthermore, when the third block is mated to the second block, their corresponding transverse slots 68, 124 are aligned forming a main transverse slot 145 (FIG. 1B). A metering block injector 146 (FIGS. 5A and 5B) is fitted in the main transverse slot 145. The metering block is a plate like structure. In the exemplary embodiment shown in FIG. 5B, an internal channel 148 is formed within the metering block extending from an inlet opening 150 defined on a lower end 151 of the metering block to an opening 152 having a diameter slightly smaller than the diameter of the cylinder defined by the first and third semi-cylindrical grooves when the first and third blocks are mated together. The metering block opening is plugged with a nylon bumper 154 having a plurality of openings 156 formed through the bumper thickness. A fitting 158 is coupled to the inlet opening 150. Pressurized air is injected through the fitting and is ejected through the openings 156 formed in the nylon bumper.

A slot 160 is formed penetrating through the thickness of the metering block. This slot width increases gradually from a width 161 at the lower end 151 of the metering block to a maximum width 162 in a direction away from the lower end 151 of the metering block. The slot maximum width 162 should be large enough to accommodate a desired diameter rivet head while the slot lower end width 161 should be large enough to accommodate a desired diameter rivet shaft.

When the metering block is fitted within the main transverse slot 145 of the third block, it is coupled to the second actuator 134. In this regard the second actuator can cause the metering block to move along the main transverse slot 145 defined between the two main blocks to a position wherein the nylon bumper 154 is aligned with a cylindrical opening 155 defined by the first and third semi-cylindrical grooves and into a position wherein the slot 160 formed through the metering block ejector is aligned with the gap 144 defined between the lower edges of the first and third semi-cylindrical grooves. A guide pin 164 preferably extends from the metering block and is fitted through an opening formed on the plate 132 coupled to the second actuator 134 for guiding the sliding movement of the metering block. In the exemplary embodiment, the metering block is mounted within the main transverse slot with the nylon bumper facing toward the rear of the body blocks.

Figure 6:
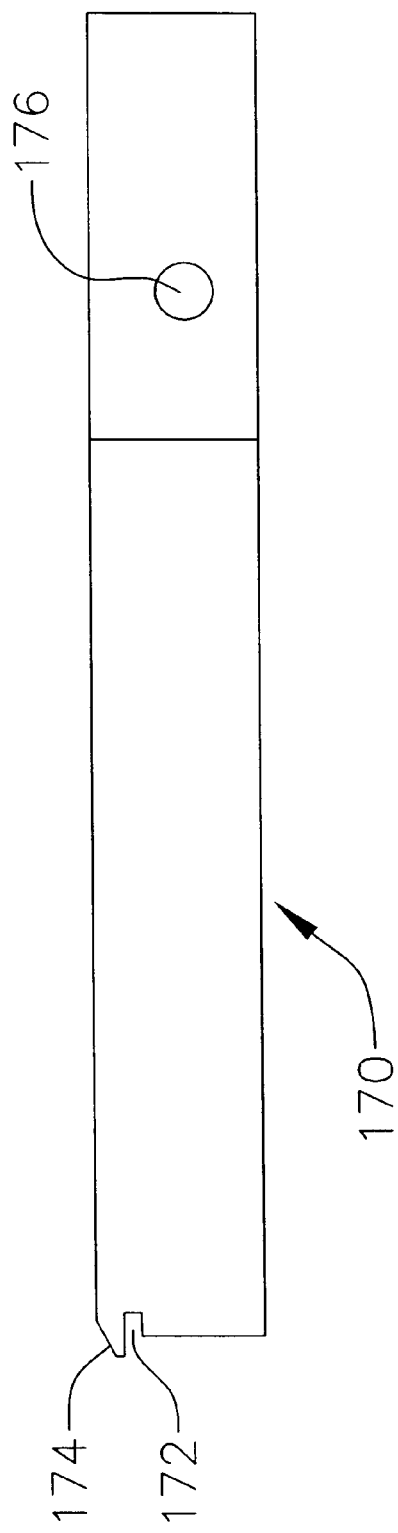
FIG. 6 is a side view of an exemplary embodiment blade incorporated in the exemplary embodiment orienting ejector shown in FIG. 1A.

A blade 170 is fitted within the slot 114 defined by the longitudinal recesses of the first and second main blocks (FIG. 1C). The blade has a width slightly smaller than the width of the slot 114 such that it can fit and slide within the slot 114. In an exemplary embodiment blade as for example shown in FIG. 6, a longitudinal notch 172 is formed at the upper front end of the blade. The notch helps define an upper finger 174 extending from the front end of the blade. In the exemplary embodiment, the length of the finger is such that it extends slightly beyond the front end of the blade. At least one transverse opening 176 is formed transversely through the blade.

Figure 7:
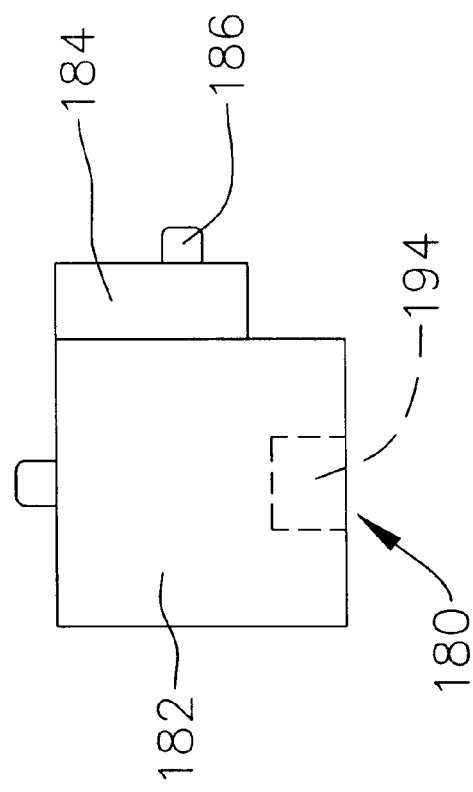
FIG. 7 is a side view of an exemplary embodiment blade carrier block used in the exemplary embodiment orienting ejector shown in FIG. 1A.

A blade carrier block 180 is fitted within the cavity 62 formed on the first main block which extends to the longitudinal recess 56 formed on the first block (FIG. 1A). An exemplary carrier block as shown in FIG. 7 comprises a first section 182 from which extends a second section 184 of narrower width. In other words, the width of the block is stepped down from the first section to the second section. The second section 184 is fitted within the longitudinal slot 60 formed on the first main block lower section. The width of the second section is such that it can fit within and slide along the slot 60. Consequently, the longitudinal slot 60 formed on the first main block extending to the longitudinal recess also serves as a guide for guiding the travel of the blade carrier block. A pin 186 extends from the carrier block second section. The pin 186 is fitted into the transverse opening 176 formed on the blade 170. In this regard, as the blade carrier block 180 slides back and forth along the slot 60, it causes the blade 170 to reciprocate along the slot 114 defined by the longitudinal recesses of the first and second main blocks.

An air cylinder 190 is used to move the carrier block and therefore the blade. The air cylinder is coupled to the body 10 as for example shown in FIG. 1B. In the exemplary embodiment shown in FIGS. 1A and 1B, the air cylinder 190 is fitted within a housing 194 which is coupled to the rear end of the body. The air cylinder has an actuator shaft 192 which is fitted through the end opening 66 formed on the rear end 22 of the first block and into the first block cavity 62 where it is coupled to the blade carrier block (FIG. 1B). Typically this is accomplished by threading the shaft 192 into a threaded opening, as for example threaded opening 194 shown in FIG. 7, formed on the blade carrier block.

In an exemplary embodiment, the air cylinder 190 is a three position cylinder. In the first position the cylinder is able to move back and forth in relatively long strokes as for example, half inch strokes. In a second position the cylinder moves forward in a "jabbing" fashion. In a third position the cylinder moves its shaft forward to a desired position and afterwards retracts the shaft.

Referring to FIGS. 1A, 1B and 8, a tube adapter 200 is fitted into the cylindrical opening defined on the upper surface of the main body by the first and second semi-cylindrical grooves. The diameter 202 at one end of the tube adapter is reduced to fit within the larger diameter portion cylindrical opening defined by the larger diameter 46, 110 portions of the first and second semi-cylindrical grooves. By reducing the diameter of the tube adapter, an annular shoulder 204 is formed that allows the tube adapter to sit against the upper surface of the main body. The opposite end of the tube adapter is cut at an angle thereby defining an oval opening 206 for receiving rivets from a rivet distributing system.

In the exemplary embodiment shown in FIGS. 1A, and 1C, a pan 210 is coupled to the first main block using screws 212. The pan extends below the upper section 28 of the first main block. The pan has a slot 214 defined through a front wall 216 which is aligned with the gap 144 defined between the lower edges of the first and third semi-cylindrical grooves when the first and third main body blocks are coupled together. In the exemplary embodiment, the width 215 of the slot is greater than the diameter of the shafts of the rivets to be ejected. An opening 218 is defined through a wall 220 of the pan transverse to the front pan wall. A tubular section 222 extends from the opening providing access to the opening. A hose (not shown) coupled to a vacuum (not shown) is mounted on the tubular section providing suction to the pan.

In operation, the width of the gap 144 between the lower edges of the first and third semi-cylindrical grooves when the first and third sections are mated together is controlled by the length of the pins 86 extending from the first main block and the depth of the corresponding openings 136 formed on the third main block. The width of this gap 144 should be such so as to allow penetration by the shaft of the rivet. While the gap 144 can be controlled by the length of the pins 86 and depth of openings 136, in an alternate embodiment the gap can be controlled by the first actuator 80 by controlling the movement of the actuator pin 84. In other words, the actuator may pull push the actuator pin a predetermined distance so as to create a gap having a predetermined width between the lower edges of the first and third semi-cylindrical grooves.

The blade is aligned to penetrate a lower section of the cylindrical opening 155 defined by the first and third semi-cylindrical grooves. Consequently, the blade 170 is also aligned to penetrate the gap 144 defined by the lower edges of the first and third semi-cylindrical grooves.

A sensor 230, as for example, a photoelectric sensor or a proximity sensor is mounted proximate the gap for sensing the if the rivet is in a proper position for ejecting. A typical sensor is a infrared fiberoptic tip sensor manufactured by SUNX. The sensor senses when the rivet shaft has penetrated the gap 144. The sensor sends signals, indicative of whether the rivet is in a proper position for ejection, to a processor 232. The processor then controls the operation of the air cylinder 190 by controlling the pneumatics (not shown) driving the air cylinder. In an alternate embodiment, two sensors may be used. With this embodiment one sensor is positioned below the gap for sensing when the rivet shaft has penetrated the gap and properly positioned for being ejected. The second sensor is positioned above the gap for sensing when the rivet shaft has not penetrated the gap and thus is not properly seated for ejection.

The processor also controls the operation of the first and second actuators 80, 134. Furthermore, the controller controls the air input into the metering block 146. Alternatively more than one processors may receive signals from the sensor 230 and control the operation of the air cylinder, first and second actuators, and the metering block. A ring sensor (not shown) such as a photoelectric cell may also be mounted on the tube adapter for sensing when a rivet has been fed to the ejector.

In operation the first and third blocks 14, 18 are mated together in a spaced apart relationship defining the gap 144 between the lower edges of the first and third semi-cylindrical grooves. The metering block 146 is positioned in the transverse slot 145 such that the nylon bumper 154 with openings 156 is aligned with the cylindrical opening 155 defined by the first and third semi-cylindrical grooves and faces rearwardly. Air input through fitting 158 is ejected through the nylon bumper.

The rivets are fed through the tube adapter 200 into the cylindrical opening 155 between the metering ejector 146 and the blade 170. In many instances the shaft of the rivet will fall through the gap 144. In such case, the sensor 230 sends a signal indicative of penetration of the gap 144 by the rivet shaft. The controller sends a signal to actuate the second actuator 134 and move the metering block 146 to a position such that the metering block slot 160 is aligned with the gap 144. The controller then will send to appropriate signal to control operation of the air cylinder causing the air cylinder to push the blade 170 and thus, the rivet along the gap 144 and through the slot 160 of the metering block and into position to be ejected along the proper orientation. The metering block is then returned to its original position with the nylon bumper aligned with the cylindrical opening 155.

If the rivet is not oriented properly, the sensor will provide the appropriate signal to the processor which in turn will provide a signal to the pneumatics controlling the air cylinder for moving the blade back and forth. A signal is also sent by the processor to activate the air injection to the metering block. The air ejected through the metering block bumper along with the pushing provided by the blade attempt to cause the rivet shaft to penetrate the gap 144. If that does not work within a prescribed time, then the processor will send a signal to pneumatically control the cylinder to cause the blade to "jab" at the rivet. That along with the pressurized air coming out of the nylon bumper of the metering block should cause the rivet properly orient itself and the shaft of the rivet to fall within the lower gap 144 defined between the two blocks. When the shaft of the rivet penetrates the lower gap 144 and such penetration is sensed by the sensor, the sensor will send a signal to the processor which will send a signal to the second actuator for sliding the metering block such that the metering block slot 160 is aligned with the gap. The processor will also send a signal to the pneumatics controlling the air cylinder to cause the air cylinder to cause the blade to move forward pushing the rivet through the slot 160 on the metering block and into position for injection. Afterwards the air cylinder retracts the blade and the second actuator receives a signal from the processor causing it to return the metering block into a position such that the nylon bumper is aligned with the cylindrical opening 155.

If a rivet cannot be aligned within a certain predetermined period of time, the processor sends a signal to the first actuator 80 which, by extending the actuator pin 84, causes the second block to move away from the first block widening the gap 144 sufficiently to allow the rivet head and thus the rivet to fall within the pan 210. The vacuum coupled to the pan tubular section sucks and discards the rivet. After the second block is moved away allowing the rivet to drop in the pan, the actuator pulls on the pin for causing the second block to move toward the first block and into its original position. The vacuum may be selectively turned on when a sensor senses that a rivet has been dropped into the pan.

The actuators using the exemplary embodiment are pneumatic actuators. However, other types of actuators may be used as for example solenoids. Similarly instead of an air cylinder other types of actuators can be used such as a solenoid.

It should be noted that the invention has been described by means of an exemplary embodiment. However, the invention should not be limited only to this exemplary embodiment. For example, the slot accommodating the blade carrier block can be formed on the second body section and not the first. Moreover, the body may be formed of two sections instead of three. Furthermore, the first actuator may be coupled to the third body block while the second actuator may be coupled to the first body block. In addition, instead of the third block, the first actuator may be made to move the first block.

In a further exemplary embodiment, the cavity 62 formed on the first body section may be covered with a plate. In addition another bracket may be used which is attached to either body to either the first or second body section for coupling the ejector to a structure.

What is claimed is:

1. An orienting ejector comprising:
a body comprising an opening for receiving a fastener having a head having a diameter and a shaft having a diameter smaller than the diameter of the head;
an adjustable gap defined longitudinally along a body portion surrounding the opening, wherein the gap is adjustable to a first width greater than the shaft diameter and smaller than the head diameter and to a second width greater than the head diameter; and
a blade moveable within the gap.

2. An orienting ejector as recited in claim 1 further comprising an air metering block comprising an air inlet and an air outlet, wherein the metering block is fitted within the body transversely to the opening, wherein the metering block can move between a first position aligning the air outlet with the opening and a second position where the air outlet is offset from the opening.

3. An orienting ejector as recited in claim 2 wherein the metering block further comprises a slot for allowing penetration by the fastener, wherein when the metering block ejector is in the second position, the metering block ejector slot is aligned with the gap.

4. An orienting ejector as recited in claim 3 further comprising an actuator for moving the metering block.

5. An orienting ejector as recited in claim 1 further comprising as air-cylinder coupled to the blade for moving the blade.

6. An orienting ejector as recited in claim 1 further comprising a sensor for sensing whether a fastener shaft has penetrated the gap.

7. An orienting ejector as recited in claim 1 wherein the body comprises at least two spaced apart blocks, wherein the opening is defined by first groove formed on the first of said at least two blocks and a second groove formed on the second of said at least two blocks, and wherein the gap is defined between an edge of the first groove and an edge of the second groove.

8. An orienting ejector as recited in claim 7 further comprising an actuator coupled to the second block for moving the second block relative to the first gap and thereby adjusting the width of the gap.

9. An orienting ejector as recited in claim 1 wherein the body comprises at least two blocks, wherein a first longitudinal depression is formed along a first of said at least two blocks, wherein a second longitudinal depression is formed along the second of said at least two blocks, wherein the first block is mated to the second block and wherein the two depressions define a slot for housing and guiding the blade.

10. An orienting ejector as recited in claim 9 wherein the body further comprising a third block spaced apart from the first block, wherein the opening is defined a first groove formed on the first block and a second groove formed on the third block, and wherein the gap is defined between an edge of the first groove and an edge of the second groove.

11. An orienting ejector as recited in claim 10 further comprising an actuator coupled to the third block for moving the third block relative to the first gap and thereby adjusting the width of the gap.

12. An orienting ejector as recited in claim 1 further comprising a pan coupled to the body for collecting fasteners discarded through the gap.

13. An orienting ejector as recited in claim 12 further comprising a vacuum coupled to the pan for sucking away fasteners located in the pan.

14. An orienting ejector as recited in claim 1 wherein the gap is adjusted to the second width for allowing the fastener is fall through the gap.

15. An orienting ejector as recited in claim 1 wherein said ejector orients fasteners having a head diameter equal to their length.

16. An orienting ejector comprising:
a body comprising an opening for receiving a fastener having a head having a diameter and a shaft having a diameter smaller than the diameter of the head;
a gap defined longitudinally along a body portion surrounding the opening wherein the gap has a width greater than the shaft diameter and smaller than the head diameter, whereby a fastener shaft can penetrate the gap;
a sensor for sensing whether a fastener shaft has penetrated the gap; and
a blade moveable within the gap.

17. An orienting ejector as recited in claim 16 further comprising an air metering block comprising an air inlet and an air outlet, wherein the metering block is fitted within the body transversely to the opening, wherein the metering block can move between a first position aligning the air outlet with the opening and second position where the air outlet is offset from the opening.

18. An orienting ejector as recited in claim 17 wherein the metering block further comprises a slot for allowing penetration by the fastener, wherein when the metering block ejector is in the second position, the metering block ejector slot is aligned with the gap.

19. An orienting ejector as recited in claim 17 wherein the body comprises at least two spaced apart blocks, wherein the opening is defined by first groove formed on the first of said at least two blocks and a second groove formed on the second of said at least two blocks, and wherein the gap is defined between an edge of the first groove and an edge of the second groove.

20. An orienting ejector as recited in claim 19 further comprising an actuator coupled to the second block for moving the second block relative to the first gap and thereby adjusting the width of the gap.

21. An orienting ejector as recited in claim 17 wherein the body comprises at least two blocks, wherein a first longitudinal depression is formed along a first of said at least two blocks, wherein a second longitudinal depression is formed along the second of said at least two blocks, wherein the first block is mated to the second block and wherein the two depressions define a slot for housing and guiding the blade.

22. An orienting ejector as recited in claim 21 wherein the body further comprising a third block spaced apart from the first block, wherein the opening is defined a first groove formed on the first block and a second groove formed on the third block, and wherein the gap is defined between an edge of the first groove and an edge of the second groove.

23. An orienting ejector as recited in claim 22 further comprising an actuator coupled to the third block for moving the third block relative to the first gap and thereby adjusting the width of the gap.

24. An orienting ejector as recited in claim 17 further comprising a pan coupled to the body for collecting fasteners discarded through the gap.

25. An orienting ejector as recited in claim 24 further comprising a vacuum coupled to the pan for sucking away fasteners located in the pan.

* * * * *